United States Patent
Koehler et al.

(10) Patent No.: US 8,299,157 B2
(45) Date of Patent: Oct. 30, 2012

(54) STRONTIUM CARBONATE DISPERSION AND REDISPERSIBLE POWDER OBTAINED THEREFROM

(75) Inventors: Karl Koehler, Diekhozen (DE); Ferdinand Hardinghaus, Bad Honnef (DE)

(73) Assignee: Solvay Infra Bad Hoenningen GmbH, Hannover (DE)

( * ) Notice: Subject to any disclaimer, the term of this patent is extended or adjusted under 35 U.S.C. 154(b) by 588 days.

(21) Appl. No.: 11/573,613

(22) PCT Filed: Aug. 9, 2005

(86) PCT No.: PCT/EP2005/008617
§ 371 (c)(1),
(2), (4) Date: Jul. 13, 2007

(87) PCT Pub. No.: WO2006/018180
PCT Pub. Date: Feb. 23, 2006

(65) Prior Publication Data
US 2007/0254982 A1 Nov. 1, 2007

(30) Foreign Application Priority Data
Aug. 14, 2004 (DE) .......................... 10 2004 039 485
Jun. 4, 2005 (DE) .......................... 10 2005 025 717

(51) Int. Cl.
*A61K 8/81* (2006.01)
*C08K 3/10* (2006.01)

(52) U.S. Cl. ........................................ 524/280; 524/436

(58) Field of Classification Search .................. 524/280, 524/436
See application file for complete search history.

(56) References Cited

U.S. PATENT DOCUMENTS

| | | | | |
|---|---|---|---|---|
| 4,228,300 A * | 10/1980 | Lannert | ......................... | 560/180 |
| 5,151,218 A * | 9/1992 | Haubennestel et al. | ........ | 516/77 |
| 5,338,353 A | 8/1994 | Uchino et al. | | |
| 6,111,054 A * | 8/2000 | Haubennestel et al. | ....... | 528/176 |
| 6,210,473 B1 * | 4/2001 | Boils et al. | ................. | 106/31.43 |
| 6,364,224 B1 | 4/2002 | Pearce | | |
| 6,478,866 B1 | 11/2002 | Nyssen et al. | | |
| 6,479,029 B1 * | 11/2002 | Mingels et al. | ............... | 423/432 |
| 6,777,517 B1 * | 8/2004 | Albrecht et al. | ........... | 526/317.1 |
| 2003/0084820 A1 * | 5/2003 | Okamoto et al. | ............. | 106/401 |
| 2003/0124048 A1 * | 7/2003 | Hardinghaus et al. | ........ | 423/554 |
| 2007/0122331 A1 * | 5/2007 | Amirzadeh-Asl | ............ | 423/274 |

FOREIGN PATENT DOCUMENTS

| | | |
|---|---|---|
| WO | 97 15530 | 5/1997 |
| WO | 99 28050 | 6/1999 |
| WO | WO 0158809 A2 * | 8/2001 |
| WO | 01 92157 | 12/2001 |

OTHER PUBLICATIONS

Tagaya, A., et al. Compensation of the Birefringence of a Polymer by a Birefringent Crystal. Science, vol. 301, p. 812-814, Aug. 8, 2003.*
Ullmann's Encyclopedia of Industrial Chemistry: Surfactants, 2000.*
Ullmann's Encyclopedia of Industrial Chemistry: Disperse Systems and Dispersants, 2000.*
Akihiro Tagaya, at al., "Compensation of the Birefringence of a Polymer by Birefringent Crystal", Science, vol. 301, No. 5634, XP 002376062, pp. 812-814, 2003.
Hisanori Ohkita, et al., "Preparation of a Zero-Birefringence Polymer Doped with a Birefringent Cystal and Analysis of its Characteristics", Macromolecules, vol. 37, No. 22, XP 002375992, pp. 8342-8348, 2004.
U.S. Appl. No. 10/581,685, filed Dec. 14, 2006, Hardingghaus, et al.
U.S. Appl. No. 10/581,684, filed Jun. 6, 2006, Stahl, et al.
U.S. Appl. No. 11/916,340, filed Dec. 3, 2007, Hardingghaus, et al.
U.S. Appl. No. 11/916,408, filed Dec. 3, 2007, Hardingghaus, et al.
U.S. Appl. No. 11/916,394, filed Dec. 3, 2007, Koehler, et al.
U.S. Appl. No. 11/916,353, filed Dec. 3, 2007, Koehler, et al.

* cited by examiner

*Primary Examiner* — William Cheung
(74) *Attorney, Agent, or Firm* — Oblon, Spivak, McClelland, Maier & Neustadt, L.L.P.

(57) ABSTRACT

The invention discloses dispersions of preferably modified strontium carbonate in organic liquids, for example in alcohols, ketones or particularly methylene chloride. The dispersions are usable for the preparation of polymers which have reduced birefringence or no birefringence and are therefore suitable for optical applications.

The powder obtainable after the removal of the organic liquid can surprisingly be converted back to a dispersion with little energy.

27 Claims, No Drawings

STRONTIUM CARBONATE DISPERSION AND REDISPERSIBLE POWDER OBTAINED THEREFROM

This application is a 371 of PCT/EP05/08617 filed Aug. 9, 2005.

The invention relates to dispersions of strontium carbonate in organic liquids, to powder obtainable from the dispersions and to its use as an additive in polymers with reduced birefringence or without birefringence.

As explained by A. Tagaya, H. Ohkita, M. Mukoh, R. Sakaguchi and Y. Koike in Science, Vol. 301 (2003), pages 812 to 815, optical polymers find use for optical items such as lenses, or as functional films for liquid-crystal displays. However, owing to the alignment of the polymer chains, such polymers have a tendency to form birefringence in the course of processing; this forms an anisotropic material. As a result, the optical properties worsen.

As further explained in the cited publication in Science, various proposals have already been made to counteract the birefringence. For example, the mixing of polymers, copolymerization with random alignment or by incorporation of anisotropic molecules is said to lead to items without birefringence. Particularly the mixing of polymers is a known method. However, it is difficult to mix polymers homogeneously enough.

Tagaya et al. propose counteracting the birefringence by incorporating inorganic materials crystallized in a rod shape. Strontium carbonate was used in the form of crystals which were in rod-shaped for and had a length of 200 nm and a thickness of 20 nm. These crystals were surface-treated with bis(dioctyl pyrophosphate) oxyacetate titanate and, in amounts of 0.3 to 1% by weight based on the total weight, introduced into a solution of poly[methyl methacrylate (MMA)-co-benzyl methacrylate(BzMA)] in tetrahydrofuran. The resulting mixture was then cast to films and the optical properties were tested.

It is an object of the present invention to specify a processed strontium carbonate which is usable in optical polymers and can be incorporated readily. This object is achieved by the inventive dispersions and the inventive redispersible powder which is obtainable from them.

One aspect of the invention comprises rod-shaped strontium carbonate particles of a length of not more than 1000 nm n, preferably not more than 500 nm, in particular not more than 200 nm, dispersed in an organic liquid or water, the dispersion of the particles in the organic liquid being obtained using a dispersant. These limits apply to at least 90% of all particles, preferably to at least 95%, especially to essentially all particles.

The term "rod-shaped" means that the length of the particles exceeds the thickness of the particles. The ratio of length to thickness is preferably at least 2.

Preferred continuous phases are organic liquids. Usable organic liquids are protic and aprotic organic liquids. Liquids with protons which are so acidic that they react with the strontium carbonate with $CO_2$ elimination are less suitable. Readily usable organic liquids are linear or branched alcohols, for example those having 1 to 6 carbon atoms, linear or branched ketones, for example those having 3 to 10 carbon atoms, cyclic ketones such as cyclopentanone, hydrocarbons or hydrocarbon mixtures such as special-boiling-point spirit, and halogenated hydrocarbons, for example chlorohydrocarbons such as dichloromethane (methylene chloride). Esters of carboxylic acids, for example those of carboxylic acids having, for example, a total of 2 to 6 carbon atoms and alcohols having 1 to 4 carbon atoms are also usable. It is assumed that linear aliphatic ethers or cyclic ethers having preferably up to 6 carbon atoms are also suitable as solvents.

The strontium carbonate can be prepared by known methods, for example from strontium hydroxide and $CO_2$. Such a process is described in WO 97/15530. An aqueous strontium hydroxide solution is contacted with $CO_2$ gas in a reactor in which shearing and frictional forces act on the reaction mixture. If desired, a crystallization inhibitor may also be present in the precipitation. In the present invention, it is possible to use unmodified strontium carbonate, but preference is given to using a strontium carbonate which comprises a crystallization inhibitor. It may be advantageous when at least some of the crystallization inhibitor is deprotonated, for example by using the crystallization inhibitor at least partly or completely as the alkali metal salt, for example as the sodium salt or as the ammonium salt. Of course, the inhibitor can also be used in the form of the acid and an appropriate amount of the base or of the alkali can be added.

The crystallization inhibitor used may, for example, be a compound or a salt of the formula (I) with a carbon chain R and n [A(O)OH] substituents where R is an organic radical which has hydrophobic and/or hydrophilic substructures and where K is a low molecular weight, oligomeric or polymeric, branched, unbranched and/or cyclic carbon chain which optionally contains oxygen, nitrogen, phosphorus or sulphur as heteroatoms, and/or is substituted by radicals which are bonded to the R radical via oxygen, nitrogen, phosphorus or sulphur, and where A is C, P(OH), OP(OH), S(±) or OS(O), and n is 1 to 10 000.

When they are monomeric or oligo eric compounds, n is preferably 1 to 5.

Usable crystallization inhibitors of this type include hydroxy-substituted carboxylic acid compounds. For example, hydroxy-substituted mono- and dicarboxylic acids with 1 to 20 carbon atoms in the chain (calculated without the carbon atoms of the COO groups) are readily usable, for example citric acid, malic acid (2-hydroxy-1,4-dibutanoic acid), dihydroxysuccinic acid and 2-hydroxyoleic acid. Very particular preference is given to citric acid and polyacrylate as the crystallization inhibitor.

Also very readily usable are phosphonic acid compounds having an alkyl (or alkylene) radical with a chain length of 1 to 10 carbon atoms. Usable compounds are those which have one, two or more phosphonic acid radicals. They may additionally be substituted by hydroxyl groups. Very usable examples are 1-hydroxyethylenediphosphonic acid, 1,1-diphosphonopropane-2,3-dicarboxylic acid, 2-phosphonobutane-1,2,4-tricarboxylic acid. These examples show that it is also possible to use those compounds which have both phosphoric acid radicals and carboxylic acid radicals.

Also very readily usable are compounds which contain 1 to 5 or even more nitrogen atoms and 1 or more, for example up to 5, carboxylic acid or phosphonic acid radicals and are optionally additionally substituted by hydroxyl groups. Examples include compounds having an ethylenediamine or diethylenetriamine base structure and carboxylic acid or phosphonic acid substituents. Readily usable compounds are, for example, diethylenetriaminepentakis(methanephosphonic acid), iminodisuccinic acid, diethylenetriaminepentaacetic acid, N-(2-hydroxyethyl)ethylenediamine-N,N,N-triacetic acid.

Also very readily usable are polyamino acids, for example polyaspartic acid.

Also very readily usable are sulphur-substituted carboxylic acids having 1 to 20 carbon atoms (calculated without the carbon atoms of the COO group) and 1 or more COO groups, for example bis(2-ethylhexyl) sulphosuccinate (dioctyl sulphosuccinate).

It is of course also possible to use mixtures of the additives, for example also with further additives such as phosphorous acid.

The crystallization inhibitors present may, for example, be substances known to be used for this purpose, for example relatively short-chain or else relatively long-chain polyacrylates, typically in the form of the sodium salt; polyethers such as polyglycol ether; ether sulphonates such as lauryl ether sulphonate in the form of the sodium salt; esters of phthalic acid and derivatives thereof; esters of polyglycerol; amines such as triethanolamine; and esters of fatty acids such as stearic esters, as specified in WO 01/92157.

Also very suitable are the carboxylic salts specified in WO 97/15530 or their free acids, for example citric acid or its alkali metal or ammonium salts.

Preferred crystallization inhibitors have at least one anionic group. The crystallization inhibitor preferably contains, as an anionic group, at least one sulphate group, at least one sulphonate group, at least two phosphate groups, at least two phosphonate groups, at least two carboxylate groups or at least one hydroxyl group and at least one carboxylate group.

The strontium carbonate used for the inventive dispersions, which, according to one alternative, does not contain a crystallization inhibitor but, in a preferred alternative, does contain a crystallization inhibitor is comminuted further in the presence of a dispersant. This can be done, for example, in a bead mill.

The dispersant is described further below.

The dispersant is intended to prevent reagglomeration and to stabilize the dispersion of the strontium carbonate in the solvent. This is brought about by electrostatic forces that the dispersant exerts on the particle surface, for example by virtue of negatively charged substitutents, which consequently prevents reagglomeration, or by steric effects of the dispersant. The dispersant preferably has one or more anionic groups which can interact with the surface of the strontium carbonate. Preferred groups are the carboxylate group, the phosphate group, the phosphonate group, the bisphosphonate group, the sulphate group and the sulphonate group.

Usable dispersants are some of the abovementioned agents which, in addition to crystallization-inhibiting action, also have dispersing action. When such agents are used, crystallization inhibitor and dispersant may be identical. Suitable agents may be determined by routine tests. Such agents with crystallization-inhibiting and dispersing action have the consequence that the strontium carbonate forms readily redispersible agglomerates. When such an agent with crystallization-inhibiting and simultaneously dispersing action is used, it can be added in the precipitation and then the deagglomeration can be performed in its presence, for example in a bead mill as already mentioned above.

Typically, different compounds with crystallization-inhibiting and dispersing action are used.

What is very advantageous is inventive deagglomerated strontium carbonate which comprises dispersants which impart to the strontium carbonate particles a surface which inhibits agglomeration electrostatically, sterically, or electrostatically and sterically, and prevents reagglomeration.

A particularly advantageous deagglomerated strontium carbonate is characterized in that the dispersant has carboxylate, phosphate, phosphonate, bisphosphonate, sulphate or sulphonate groups which can interact with the strontium carbonate surface, and in that it has one or more organic R1 radicals which have hydrophobic and or hydrophilic substructures.

R1 is, for example, a low molecular weight, oligomeric or polymeric, unbranched, branched and or cyclic hydrocarbon chain which optionally contains oxygen, nitrogen, phosphorus or sulphur as heteroatoms, and/or is substituted by radicals which are bonded to the R1 radical via oxygen, nitrogen, phosphorus or sulphur, and the carbon chain is optionally substituted by hydrophilic or hydrophobic radicals. One example of such substituting radicals is that of polyether groups. Preferred polyether groups have 3 to 50, preferably 3 to 40, in particular 3 to 30, alkyleneoxy groups. The alkyleneoxy groups are preferably selected from the group consisting of the methyleneoxy, ethyleneoxy, propyleneoxy and butyleneoxy group.

An advantageous inventive strontium carbonate comprises a dispersant which has groups for attachment or incorporation into polymers. These may be groups which bring about this attachment or incorporation chemically, for example OH groups or NH groups or NH2 groups. The groups may also be those which bring about physical incorporation or attach ent.

The dispersant is appropriately adjusted to the solvent in which the strontium carbonate is to be dispersed. Dispersants with somewhat hydrophobic properties are used advantageously for the preparation of dispersions in nonpolar or low-polarity solvents.

One example of a dispersant which is suitable for the preparation of strontium carbonate dispersions in nonpolar to low-polarity solvents is that of phosphoric esters which have side chains with polyether moieties from ethylene oxide units, for example in which one oxygen atom of the P(O) group is substituted by a C3-C10-alkyl or -alkenyl radical and a further oxygen atom of the P(O) group by a polyether function. A further acidic oxygen atom of the P(O) group can interact with the strontium carbonate surface. Such dispersants are obtainable, for example from Byk Chemie under the name Disperbyk® 102 (copolymer with acidic groups), 106 (salt of a polymer with acidic groups) and 111 (copolymer with acidic groups). Nonpolar to low-polarity solvents have already been mentioned above. Particularly readily usable examples are linear ketones such as methyl ethyl ketone, esters of carboxylic acids having, for example, a total of 2 to 6 carbon atoms and alcohols having 1 to 4 carbon atoms, hydrocarbons or mixtures thereof such as special-boiling-point spirit (with boiling points of 21 to 55° C., 55 to 100° C. and that having a boiling point over 100° C.). Solvent Naphtha or halohydrocarbons, particularly methylene chloride.

Other dispersants bring about good dispersibility of the strontium carbonate in polar or protic solvents such as water, alcohols such as isopropanol or n-butanol, or ketones such as acetone. A polymer which has anionic groups which can interact with the surface of the strontium carbonate, for example the abovementioned groups, and is substituted by polar groups, for example by hydroxyl or amino groups. Polyether groups which are substituted terminally by hydroxyl groups are preferably present. Owing to this substitution, the strontium carbonate particles are externally hydrophilized. Such inventive strontium carbonate is readily dispersible and gives stable dispersions in polar or nonpolar solvents. It is even possible for there to be further deagglomeration in use. The polar groups, especially hydroxyl and amino groups, constitute reactive groups which are suitable for attachment or incorporation into corresponding plastics, for example particularly into epoxy resins. Very particularly good properties are possessed by a strontium carbonate which has been coated with a dispersant which has a multitude of polycarboxylate groups and a multitude of hydroxyl groups, and also further substituents which are sterically demanding, for example polyether groups. A very particularly preferred group of dispersants is that of polyether polycarboxylates substituted by hydroxyl groups terminally on the polyether groups.

Such strontium carbonate which comprises a crystal growth inhibitor and one of the particularly preferred dispersants which prevents reagglomeration sterically, particularly a dispersant substituted by polar groups as described above, has the great advantage that it comprises very fine primary particles and, at worst, low-agglomeration secondary particles, which are very readily usable because they are easily redispersible, for example can be incorporated readily into polymers and do not tend to reagglomerate, even deagglomerating further in use.

It has already been mentioned above that strontium carbonate is preferably used with a crystallization inhibitor. When the sum of strontium carbonate, crystallization inhibitor and dispersant (i.e. calculated without solvent) is equated to 100% by weight, the crystallization inhibitor and the dispersant are preferably present therein in an amount of in each case 1 to 15% by weight; the strontium carbonate constitutes the remainder to 100% by weight; the strontium carbonate is preferably present in an amount of 20 to 80% by weight in the sum of crystallization inhibitor, dispersant and SrCO3.

The inventive dispersions contain preferably 20 to 70% by weight of the strontium carbonate including crystallization inhibitor and dispersant, and 30 to 80% by weight of a solvent or solvent mixture. The dispersions may consist of strontium carbonate, dispersant and solvent, and also preferably crystallization inhibitor, or comprise additives.

The preparation of the inventive dispersions will be described further below.

The starting material is strontium carbonate which is present in the form of rod-shaped crystals. It can be prepared, for example, as described in WO 97/15530. The process envisages that an $Sr(OH)_2$ solution with a concentration of 0.1 to 0.75 mol/l of $Sr(OH)_2$ is admixed with carbon dioxide to form a reaction mixture, about 2 to 30 l of carbon dioxide gas being used per litre of solution, the reaction mixture being passed through a continuous mixing reactor in which shearing and frictional forces of intermeshing tools with high relative speed by the rotor-stator principle act on the reaction mixture, and the strontium carbonate formed is removed from the reaction mixture after passing through the reactor and dried. The shearing and frictional forces in the reactor have the effect that the carbon dioxide is introduced into the strontium hydroxide solution in extremely finely dispersed form. The litrage of the carbon dioxide gas is based on standard conditions. Preference is given to adding a crystallization inhibitor as described above in the precipitation. The resulting strontium carbonate is then dispersed in an organic liquid (examples are given above) or water using a dispersant. Dispersants are specified above. The dispersion is performed until the strontium carbonate particles have a length of not more than 200 nm.

The dispersion can be performed in customary equipment for communication on already small particles. Very suitable examples are bead mills or dissolvers with balls made of glass or other hard material. Premixing is possible, for example in a dissolver, (also without glass balls). The commination can be performed until the particles have the desired size; for example the length is below 200 nm or even below 150 nm.

The above-described dispersions are very suitable for the incorporation of the strontium carbonate present in dispersed form into plastics. It is possible that a portion of the solvent of the originally prepared dispersion is removed. A concentrate of the strontium carbonate in the solvent is then obtained, which can be diluted further by adding solvent. A further possible use, specifically the preparation of redispersible pulverulent strontium carbonate by removing the solvent, is described below.

The inventors have found that the inventive dispersions, after removal of the (preferably organic) solvent, give rise to a pulverulent strontium carbonate which can be redispersed again in solvents with formation of a dispersion which, with regard to the particle fineness, corresponds to the originally prepared dispersion. The dispersion can be prepared with comparatively low energy input. It is in no way essential to use the same solvent which has also been used in the preparation of the original dispersion for the redispersion, but it may be advantageous. It was unforeseeable that, after removal of the solvent from the originally prepared dispersion, a powder is obtainable which then again gives rise to a fine dispersion of strontium carbonate comparable to the original dispersion in the same or a different solvent without great energy input. The advantage is that the storage and the transport of a solvent-free, readily redispersible powder is by its nature simpler than storage and transport of a dispersion.

For the redispersion, preference is given to selecting the solvent which has already been used in preparation of the dispersion, or a solvent which has comparable polarity. Routine tests can show whether redispersion provides good results. It has already been mentioned above that dispersant and solvent should be matched to one another.

The inventive strontium carbonate, as a redispersible powder or as a dispersion or redispersion, is suitable for all purposes for which strontium carbonate or a dispersion thereof is usable. In the strontium carbonate in the dispersion, or the powder after redispersion, preferably at least 90% of all particles have a length of less than 1000 nm, more preferably less than 500 nm, even more preferably less than 300 nm, especially preferably less than 200 nm.

It is suitable particularly for preparing dispersions which can be used, for example, as a polymer additive as described above.

The dispersion of the strontium carbonate in the selected solvent, preferably $CH_2Cl_2$ or cyclopentanone, if desired obtained by dispersing the above-described redispersible powder, is mixed with the polymer precursor or the polymer. A highly homogeneous distribution is desirable. If necessary, the polymer or the polymer precursor is dissolved with a solvent or the viscosity is reduced. After the incorporation, the solvent is evaporated off if one has been used, and, if necessary, the polymerization is brought about.

The strontium carbonate is incorporated particularly advantageously into the abovementioned poly[methyl methacrylate(MMA)-co-benzyl methacrylate(BzMA)] This is advantageously present dissolved in tetrahydrofuran. After the incorporation of the dispersion, the solvent is evaporated off.

Polymers or precursors thereof, obtainable using the strontium carbonate dispersion or the redispersed powder, likewise form part of the subject-matter of the invention. Precursors are, for example, monomers which are then polymerized in a customary manner, or reactants which are processed to polymers with condensation.

The examples which follow are intended to illustrate the invention further without restricting its scope.

EXAMPLE 1

Preparation of Strontium Carbonate with Rod-Shaped Coastal Particles

As described in WO 97/15530, the strontium carbonate was prepared from a 10% $Sr(OH)_2$ solution by reacting with $CO_2$. In the precipitation, citric acid was used in such an amount that about 1.5% by weight of citric acid was present in the precipitated, dried $SrCO_3$. The particles prepared were rod-shaped. The $SrCO_3$ had a BET surface area of 32 $m^2/g$.

EXAMPLE 2

Preparation of a Dispersion of the Strontium Carbonate Prepared in Example 1 in Methylene Chloride The strontium carbonate was mixed with methylene chloride and Disperbyk® 102, a dispersant which is obtainable from Byk Chemie, and a copolymer with acidic groups based on a phosphoric ester with side chains with polyether moieties formed from epoxide units. The mixture contained 50% by weight of strontium carbonate and 10% by weight of the dispersant; the remainder to 100% by weight was formed by methylene chloride. Before the dispersion, a sample of the mixture was analysed to determine the particle size; the result is reproduced in Table 1 below under "zero".

Subsequently, the mixture was dispersed in a dissolver with the aid of glass balls. After 15 and a total of 30 min, samples were again analysed for the particle size.

A dissolver treatment (with the aid of glass balls) of a mixture of $SrCO_3$ and methylene chloride in a weight ratio of 1:1, without dispersant, was also undertaken, and the resulting particle size was determined.

The results are reproduced in Table 1 together with the zero sample:

| [µm]   | $D_{10\%}$ | $D_{50\%}$ | $D_{90\%}$ |
|--------|------------|------------|------------|
| zero   | 2.61       | 19.7       | 39.6       |
| with Byk 102 | | | |
| 15 min | 0.081      | 0.121      | 0.194      |
| 30 min | 0.083      | 0.120      | 0.182      |
| without Byk 102 | | | |
| 15 min | 8.55       | 20.8       | 42.5       |
| 30 min | 9.77       | 27.2       | 57.8       |

In the undispersed "zero" sample, 90% of all particles had a diameter of 39.6 µm and less; only 10% of all particles had a diameter of 2.61 µm and less. In the treated samples, the diameter is much smaller; 90% of all particles had a diameter of 192 nm and less. Table 1 also shows that, after 15 min, outstanding commination has already been achieved. Further treatment of the mixture in the dissolver brings about barely any further commination.

The treat ent in the dissolver without dispersant brought about, in contrast, a particle size enlargement for strontium carbonate.

EXAMPLE 3

Dispersion in a Bead Mill

After premixing in a dissolver without glass balls, Example 2 was repeated in a bead mill with comparable results.

EXAMPLE 4

Preparation of a Dispersion of Strontium Carbonate in Cyclopentanone

Example 2 was repeated, except that the dispersant used was Melpers® 0030, which is a polyether polycarboxylate whose ether groups are substituted terminally by hydroxyl groups and which therefore has hydrophilic character. It is obtainable from SKW. The solvent used was cyclopentanone.

The dispersed material corresponded to that of Example 2.

EXAMPLE 5

Preparation of Redispersible Pulverulent Strontium Carbonate from Methylene Chloride Dispersion As described in Example 2, the dispersion was obtained by treatment in the dissolver and subsequently a bead mill. The resulting dispersion was dried by removing the methylene chloride, which gave the strontium carbonate, which comprised the crystallization inhibitor mentioned in Example 2 and the dispersant mentioned in Example 2 (BYK 102), as a powder.

In order to check whether the powder is redispersible, it was introduced into methylene chloride and redispersed without glass balls in a dissolver, i.e. by means of a disc which rotated at high speed (it was found to be unnecessary to perform the redispersion, for example, in a bead mill, because the powder was redispersed readily). It was found that the proper ies of the dispersion now prepared only using a dissolver corresponded to those of the originally prepared dispersion of the strontium carbonate in methylene chloride.

The comparison used was SrCO3 which had been precipitated with citric acid. It was added directly to the dissolver and dispersion was attempted without glass balls with addition of BYK 102. The analysis showed that the $d_{90\%}$ value was 26.9 µm, the $d_{50\%}$ value 6.27 µm and the $d_{10\%}$ value 194 nm.

EXAMPLE 6

Preparation of Redispersible Pulverulent Strontium Carbonate from Cyclopentanone Dispersion The dispersion of Example 5 was dried under reduced pressure by evaporating the solvent. The pulverulent strontium carbonate comprised the crystallization inhibitor specified in Example 2 and the dispersant specified in Example 5.

It was found that this powder too, dispersed in cyclopentanone, gives rise to a dispersion whose properties corresponded to the properties of the dispersion from which the powder had been prepared. Thus, this powder too was also shown to be redispersible.

EXAMPLE 7

Production of a Plastic

As described in the above-cited publication by Tagaya, a solution of poly[methyl methacrylate(MMA)-co-benzyl methacrylate(BzMA)] in tetrahydrofuran is obtained. A dispersion of the redispersible powder prepared in Example 6, redispersed in cyclopentanone, is incorporated. The solvents are then evaporated off. The amount of dispersion is selected such that 0.5% by weight of the $SrCO_3$ is present in the remaining plastic.

The invention claimed is:
1. A dispersion comprising rod-shaped strontium carbonate particles comprising a crystallization inhibitor and having a length of not more than 1000 nm as determined by laser diffraction, dispersed in a composition comprising a dispersant and at least one organic liquid, wherein at least 90% of said rod-shaped strontium carbonate particles have a maxi- mum length of not more than 1000 nm and wherein the dispersant and crystallization inhibitor are different from one another, the dispersant comprising at least one functional group selected from the group consisting of carboxylate, phosphate, phosphonate, bisphosphonate, sulphate and sulphonate functional groups, said dispersant further comprising one or more optionally substituted polyether groups, the crystallization inhibitor being selected from the group consisting of hydroxy-substituted carboxylic acid compounds, optionally in the form of the sodium or ammonium salt; phosphonic acid compounds having an alkyl or alkylene radical with a chain length of 1 to 10 carbon atoms optionally substituted by one or more hydroxyl groups, and optionally in the form of the sodium or ammonium salt; compounds which contain at least one nitrogen atom and at least one carboxylic acid or phosphonic acid radical, optionally substituted by one or more hydroxyl groups, and optionally in the form of the sodium or ammonium salt; polyamino acids; sulphur-substituted carboxylic acids having 1 to 20 carbon atoms (calculated without the carbon atoms of the COO group) and 1 or more COO groups, optionally in the form of the sodium or ammonium salt; polyacrylates, optionally in the form of the sodium or ammonium salt; polyethers; ether sulphonates optionally in the form of the sodium or ammonium salt; esters of phthalic acid and derivatives thereof; esters of polyglycerol; amines; esters of fatty acids; and mixtures thereof.

2. The dispersion according to claim 1, wherein said composition comprises an organic liquid which is an aprotic organic liquid.

3. The dispersion according to claim 1, comprising at least one organic liquid selected from the group consisting of linear alcohols, branched alcohols, linear ketones, branched ketones, cyclic ketones, aliphatic hydrocarbons, aromatic hydrocarbons, and halogenated hydrocarbons.

4. The dispersion according to claim 1, wherein said rod-shaped strontium carbonate particles, said crystallization inhibitor, and said dispersant, when taken together constitute from 20 wt. % to 70 wt. % of the total weight of the dispersion, and said organic liquid and water constitute from 30 wt. % to 80 wt. % of the total weight of the dispersion.

5. The dispersion according to claim 1, wherein said rod-shaped strontium carbonate particles are obtained by reacting an aqueous strontium hydroxide solution with carbon dioxide in the presence of said crystallization inhibitor.

6. The dispersion according to claim 5, wherein said rod-shaped strontium carbonate particles, said crystallization inhibitor, and said dispersant, when taken together constitute from 20 wt. % to 70 wt. % of the total weight of the dispersion, and said organic liquid and water constitute from 30 wt. % to 80 wt. % of the total weight of the dispersion.

7. A process for preparing the dispersion of claim 1, wherein said process comprises dispersing said rod-shaped strontium carbonate particles in at least one of said organic liquid and water in the presence of said dispersant.

8. The process according to claim 7, further comprising comminuting the dispersion in a comminutor.

9. The process according to claim 8, wherein said comminuting is performed until said rod-shaped strontium carbonate particles have an average particle size of less than 150 nm.

10. The process according to claim 7, further comprising precipitating said rod-shaped strontium carbonate particles in the presence of a crystallization inhibitor prior to said dispersing.

11. A redispersible powder comprising dispersant coated rod-shaped strontium carbonate particles comprising a crystallization inhibitor and having a length of not more than 1000 nm, whereby said dispersant coated rod-shaped strontium carbonate particles are obtained by a process comprising removing organic liquid from a dispersion comprising rod-shaped strontium carbonate particles comprising a crystallization inhibitor and having a length of not more than 1000 nm as determined by laser diffraction, dispersed in a composition comprising a dispersant and at least one organic liquid, wherein at least 90% of said rod-shaped strontium carbonate particles have a maximum length of not more than 1000 nm and wherein the dispersant and crystallization inhibitor are different from one another, the dispersant comprising at least one functional group selected from the group consisting of carboxylate, phosphate, phosphonate, bisphosphonate, sulphate and sulphonate functional groups, said dispersant further comprising one or more optionally substituted polyether groups, the crystallization inhibitor being selected from the group consisting of hydroxy-substituted carboxylic acid compounds, optionally in the form of the sodium or ammonium salt; phosphonic acid compounds having an alkyl or alkylene radical with a chain length of 1 to 10 carbon atoms optionally substituted by one or more hydroxyl groups, and optionally in the form of the sodium or ammonium salt; compounds which contain at least one nitrogen atom and at least one carboxylic acid or phosphonic acid radical, optionally substituted by one or more hydroxyl groups, and optionally in the form of the sodium or ammonium salt; polyamino acids; sulphur-substituted carboxylic acids having 1 to 20 carbon atoms (calculated without the carbon atoms of the COO group) and 1 or more COO groups, optionally in the form of the sodium or ammonium salt; polyacrylates, optionally in the form of the sodium or ammonium salt; polyethers; ether sulphonates optionally in the form of the sodium or ammonium salt; esters of phthalic acid and derivatives thereof; esters of polyglycerol; amines; esters of fatty acids; and mixtures thereof.

12. The redispersible powder according to claim 11, whereby said organic liquid is removed by evaporation.

13. A method of counteracting birefringent properties of a plastic comprising incorporating the redispersible powder of claim 11 with a polymer, or a polymer precursor, of said plastic.

14. A method of counteracting birefringent properties of a plastic comprising incorporating the dispersion of claim 1 with a polymer, or a polymer precursor, of said plastic.

15. A plastic exhibiting reduced birefringence, wherein said plastic comprises the redispersible powder of claim 11.

16. A plastic exhibiting reduced birefringence, wherein said plastic comprises the dispersion of claim 1.

17. The dispersion according to claim 1, wherein the dispersant comprises 3 to 50 optionally substituted alkyleneoxy groups selected from the group consisting of methyleneoxy, ethyleneoxy, propyleneoxy and butyleneoxy groups.

18. The dispersion according to claim 1, wherein the dispersant is a phosphoric ester in which one oxygen atom of the P(O) group is substituted by a C3-C10-alkyl or -alkenyl radical and a further oxygen atom of the P(O) group is substituted by a polyether function.

19. The dispersion according to claim 1, wherein the dispersant is a polyether polycarboxylate substituted by hydroxyl groups terminally on the polyether groups.

20. The dispersion according to claim 1, wherein the crystallization inhibitor is citric acid.

21. The dispersion according to claim 1, comprising a dispersant having at least one carboxylate group and one or more optionally substituted polyether groups.

22. The dispersion according to claim 1, comprising a dispersant having at least one phosphate group and one or more optionally substituted polyether groups.

23. The dispersion according to claim 1, comprising a dispersant having at least one phosphonate group and one or more optionally substituted polyether groups.

24. The dispersion according to claim 1, comprising a dispersant having at least one bisphosphonate and one or more optionally substituted polyether groups.

25. The dispersion according to claim 1, comprising a dispersant having at least one sulphate group and one or more optionally substituted polyether groups.

26. The dispersion according to claim 1, comprising a dispersant having at least one sulphonate group and one or more optionally substituted polyether groups.

27. The dispersion according to claim 1, comprising a crystallization inhibitor that is selected from the group consisting of phosphonic acid compounds having an alkyl or alkylene radical with a chain length of 1 to 10 carbon atoms optionally substituted by one or more hydroxyl groups, and optionally in the form of the sodium or ammonium salt;

compounds which contain at least one nitrogen atom and at least one carboxylic acid or phosphonic acid radical, optionally substituted by one or more hydroxyl groups, and optionally in the form of the sodium or ammonium salt;

polyamino acids;

sulphur-substituted carboxylic acid; having 1 to 20 carbon atoms (calculated without the carbon atoms of the COO group) and 1 or more COO groups, optionally in the form of the sodium or ammonium salt;

polyacrylates, optionally in the form of the sodium or ammonium salt;

polyethers;

ether sulphonates optionally in the form of the sodium or ammonium salt;

esters of phthalic acid and derivatives thereof;

esters of polyglycerol;

amines;

esters of fatty acids;

and mixtures thereof.

* * * * *

UNITED STATES PATENT AND TRADEMARK OFFICE
CERTIFICATE OF CORRECTION

PATENT NO.        : 8,299,157 B2
APPLICATION NO.   : 11/573613
DATED             : October 30, 2012
INVENTOR(S)       : Karl Koehler et al.

It is certified that error appears in the above-identified patent and that said Letters Patent is hereby corrected as shown below:

On the title page, item (75) "Diekhozen (DE)" should read --Deikholzen (DE)--.

Signed and Sealed this
Eighteenth Day of December, 2012

David J. Kappos
*Director of the United States Patent and Trademark Office*

UNITED STATES PATENT AND TRADEMARK OFFICE
CERTIFICATE OF CORRECTION

PATENT NO. : 8,299,157 B2  Page 1 of 1
APPLICATION NO. : 11/573613
DATED : October 30, 2012
INVENTOR(S) : Karl Koehler et al.

It is certified that error appears in the above-identified patent and that said Letters Patent is hereby corrected as shown below:

On the title page, item (75) "Diekhozen (DE)" should read --Diekholzen (DE)--.

This certificate supersedes the Certificate of Correction issued December 18, 2012.

Signed and Sealed this
Nineteenth Day of February, 2013

Teresa Stanek Rea
*Acting Director of the United States Patent and Trademark Office*